(12) United States Patent
Zhu

(10) Patent No.: US 7,656,315 B2
(45) Date of Patent: Feb. 2, 2010

(54) COMPUTER CHINESE CHARACTER INPUT METHOD AND ITS KEYBOARD BASED ON SIMPLIFIED STROKES

(76) Inventor: Yonggang Zhu, 3463 Kennedy Blvd., Jersey City, NJ (US) 07307

( * ) Notice: Subject to any disclaimer, the term of this patent is extended or adjusted under 35 U.S.C. 154(b) by 289 days.

(21) Appl. No.: 11/585,694

(22) Filed: Oct. 24, 2006

(65) Prior Publication Data

US 2008/0111713 A1    May 15, 2008

(51) Int. Cl.
*H03K 17/00* (2006.01)

(52) U.S. Cl. .................... 341/22; 382/185; 715/263

(58) Field of Classification Search ............... 341/22; 382/185; 715/263
See application file for complete search history.

(56) References Cited

U.S. PATENT DOCUMENTS

| 4,559,615 | A | * | 12/1985 | Goo et al. | 715/263 |
| 4,684,926 | A | * | 8/1987 | Yong-Min | 341/28 |
| 5,187,480 | A | * | 2/1993 | Thomas et al. | 341/22 |
| 5,475,767 | A | * | 12/1995 | Du | 382/185 |
| 5,724,031 | A | * | 3/1998 | Huang | 341/28 |
| 7,257,528 | B1 | * | 8/2007 | Ritchie et al. | 704/7 |

* cited by examiner

*Primary Examiner*—Brian A Zimmerman
*Assistant Examiner*—Hung Q Dang (57) ABSTRACT

This computer Chinese character input method mainly includes: Select 10 elements corresponding to the 10 simplified Chinese character strokes, which are 一, 丨, 丿, 丶, 一, 丨, 乚, 丁, Z and 勹; Select 46 elements corresponding to the 46 stroke combination sets, whose representative visual representations are: 十, 厂, 七, 卜, 冂, 冂, 宀, 亻, 人, 宀, 儿, 几, 一, 丶, 一, 丨, 又, 丁, 一, 丶, 一, 丨, 又, 丁, 大, 扌, 寸, 上, 口, 夂, 广, 宀, 氵, 忄, 宀, 辶, 彐, 子, 小, 女, 纟, 王, 木, 止, 日, 月; Assign the above 10 elements and 46 elements to keys on a computer keyboard; Determine desired characters based on the elements input by a user using the keyboard mentioned above or other apparatus.

6 Claims, 4 Drawing Sheets

COMPUTER CHINESE CHARACTER INPUT METHOD AND ITS KEYBOARD BASED ON SIMPLIFIED STROKES

FIELD OF TECHNOLOGY

This invention relates to a computer Chinese character input method and its corresponding keyboard based on simplified strokes. To be more specific, it is a computer Chinese character input method and keyboard using selected simplified strokes and stroke combination sets as its elements.

BACKGROUND TECHNOLOGY

Generally speaking, any Chinese character input method requires the user's brain to consciously carry out certain kind of "preprocess" on the desired input characters before he or she can decide which key to type. For example, Pinyin input methods require users to first "associate" the desired characters with Pinyin; phonetic/ideographic or ideographic/phonetic input methods require users to first "collect" the phonetic and ideographic information of the desired characters, and then further process these information. An ideal Chinese character input method should make full use of the processing habit that Chinese character users have formed during long-time writing and reading without introducing new or additional process, or introducing as less as possible.

An optimized Chinese character input method should meet the related national standards or regulations on Chinese character structure and writing. To improve input efficiency, the existence of some illegal rules, i.e. the input rules that violate national standards or regulations, is understandable. However, user's legal inputs, i.e., the inputs that meet national standards or regulations, must be also supported. For example, it is understandable to make the input of "国" as illegal "口大", but it would be unacceptable if the legal input "口大一" is not supported. Actually, a Chinese character input method should encourage users to input in the ways that meet national standards and regulations, which will help to keep the tradition of Chinese characters as well.

Moreover, a Chinese character input method should make the arrangement of elements on the keyboard have more ergonomic benefits so that users can type at a high speed while consuming less energy by, for example, less finger movement.

CONTENT OF THE INVENTION

In this invention, selected simplified strokes are used to make one-dimensional ordered arrangement on strokes of each Chinese character according to its stroke order determined by national regulations. Since this process is very close to people's daily Chinese character handwriting habit, the goal to introduce no, or the least, new or additional process may be achieved.

On the other hand, the inventor makes further statistics on the relationship between elements and their usage frequencies according to the statistical results of character usage frequencies. In this invention, the high-frequency elements are assigned to easily typed keys; the elements that are usually input consecutively are assigned to the keys that will be typed by left and right hands alternately.

Furthermore, this input method supports related national standards and regulations on Chinese character structure and handwriting, allowing users to input a character as long as its strokes are input in correct stroke order.

According to one aspect of this invention, it provides a computer Chinese input method, which includes: select 10 elements corresponding to the 10 simplified strokes, which are 一, 丨, 丿, 丶, 乛, 丨, 乚, 乛, z, and ㄣ; assign these 10 elements to keys on the keyboard; determine desired characters based on the elements input by a user using a keyboard or other apparatus.

According to one aspect of this invention, it provides a computer Chinese input method, which includes: select 46 elements corresponding to the 46 stroke combination sets, whose representative visual representation are: 十, 厂, 七, 卜, 冂, 门, 亻, 人, 八, 儿, 八, 乂, 冖, 又, 丁, 厶, 力, 阝, 三, ... 广, ... 氵, 忄, ... 乚, ∃, 子, 小, 女, 纟, 王, 木, 止, 日, 月; assign these 46 elements together with the above 10 elements to keys on the keyboard; determine desired characters based on the elements input by a user using a keyboard or other apparatus.

According to a further aspect of this invention, the 8 elements with z and ㄣ excluded from the 10 elements mentioned above and the 46 elements are assigned to keyboard as the following way:

木
扌
忄
了
土
人
儿
厂
大
丿
冖
卜
レ
口
丨
乛
纟
辶
冂
门
一
丄
广
日
力
小
王
子
三
十
又
上
月
寸
七
几
辶
阝
丨
丶
乛
宀
夂
刁
亻
厶

-continued

| | |
|---|---|
| | 宀 |
| | ⋁ |
| | 冫 |
| | 丷 |
| | 艹 |
| | 女 |
| | ヨ |
| | 止 |

In the above table, elements in the same line are assigned to the same key and those in different lines are assigned to different keys.

According to a further aspect of this invention, using standard English QWERTY keyboard, the 8 elements with 乙 and 𠃌 excluded from the 10 elements mentioned above and the 46 elements are assigned to keyboard as the following way:

| | | |
|---|---|---|
| A | 木 | 宀 |
| B | 扌 | 卜 |
| C | 忄 | レ |
| D | 了 | 口 |
| E | 土 | 亅 |
| F | 人 | 𠃍 |
| G | 儿 | 纟 |
| H | 厂 | 辶 |
| I | 大 | 冂 |
| J | 丿 | 阝 |
| K | 一 | 丨 |
| L | 丄 | 丶 |
| M | 广 | 冖 |
| N | 日 | 宀 |
| O | 力 | 夂 |
| P | 小 | 勹 |
| Q | 王 | 亻 |
| R | 子 | 厶 |
| S | 三 | 宀 |
| T | 十 | ⋁ |
| U | 又 | 冫 |
| V | 上 | 丷 |
| W | 月 | 艹 |
| X | 寸 | 艹 |
| Y | 七 | 女 |
| Z | 几 | ヨ |
| Caps Lock | 辶 | 止 |

In the above table, the first 26 letters in the first column from the left stand for the letter keys on the keyboard, while "Caps Lock" stands for the capital lock key on the keyboard. The elements in the same line are assigned to the key in that line.

According to another aspect of this invention, it provides a computer Chinese character input keyboard, which includes: keys with symbols of the 10 elements corresponding to 10 simplified strokes, which are: 一丨丿丶㇏㇀乛乚, 乙, and 𠃌.

According to a further aspect of this invention, keys on the above keyboard are further marked with symbols of the 46 elements corresponding to 46 stroke combination sets. The representative visual representations of these 46 stroke combination sets are: 十, 厂, 扌, 卜, 𠃍, 𠃌, 忄, 人, 冖, 儿, 几, 辶, 一, 丨, 丷, 三, 丄, 十, 土, 扌, 又, 士, 口, 久, 广, 小, 乂, 丷, 勹, 纟, 辶, 广, 王, 木, 止, 日, 月.

According to a further aspect of this invention, symbols of the 8 elements, excluding 乙 and 𠃌 from the 10 elements, and symbols of the 46 elements mentioned above are assigned to keys on the mentioned keyboard as follows:

| |
|---|
| 木 |
| 扌 |
| 忄 |
| 了 |
| 土 |
| 人 |
| 𠃍 |
| 卜 |
| レ |
| 口 |
| 亅 |
| 𠃍 |
| 儿 |
| 厂 |
| 大 |
| 丿 |
| 一 |
| 丄 |
| 广 |
| 日 |
| 力 |
| 小 |
| 王 |
| 子 |
| 三 |
| 十 |
| 又 |
| 上 |
| 月 |
| 寸 |
| 七 |
| 几 |
| 辶 |
| 纟 |
| 辶 |
| 冂 |
| 阝 |
| 丨 |
| 丶 |
| 冖 |
| 宀 |
| 夂 |
| 勹 |
| 亻 |
| 厶 |
| 宀 |
| ⋁ |
| 冫 |
| 丷 |
| 艹 |
| 女 |
| ヨ |
| 止 |

In the above table, symbols in the same line are assigned on the same key and those in different lines are assigned on different keys.

According to another further aspect of the invention, it provides a set of labels used for computer Chinese character input keyboard. Each label may be used to adhere to a key and is marked with symbols of the elements corresponding to simplified strokes and stroke combination sets. The simplified strokes and representative visual representations of those stroke combination sets are: 一, 丨, 丿, 丶, 乛, 丨, 丿, 乙, 乛, 十, 厂, 七, 卜, 刂, 冂, ⺈, 亻, 人, 勹, 儿, 几, 丷, 丶, 亠, 亠, 宀, 冖, 丷, 亠, 兰, 丷, 廾, 亓, 寸, 上, 匚, 匹, 匸, 戈, 十, 匕, 匚, 彐, 子, 小, 女, 丬, 王, 木, 止, 日, 月.

According to another further aspect of the invention, it provides a set of keys used for computer Chinese character input keyboard. Each key may be used as a key to replace the existing one in a keyboard and is marked with symbols of the elements corresponding to simplified strokes and stroke combination sets. The simplified strokes and representative visual representations of those stroke combination sets are: 一, 丨, 丿, 丶, 乛, 乙, 丩, 十, 厂, 七, 卜, 冂, 匚, ⺈, 亻, 勹, 儿, 几, 丷, 丶, 亠, 宀, 冖, 丷, 亠, 丷, 廾, 寸, 匕, 卜, 三, 土, 艹, 扌, 土, 上, 口, 乂, 丆, 一, 丨, 一, 乚, 一, 皿, 子, 小, 土, 牛, 王, 木, 止, 日, 月.

DETAILED DESCRIPTION

Stroke is the smallest continuous stroke unit to form a regular script Chinese character. The column of "Chinese Character Strokes" in Table 1 lists 34 kinds of strokes. In table 1:

The column of "Name of Stroke That Each Element Is Corresponding To" gives names for these 34 strokes, while their abbreviations or alternate names are in the brackets respectively.

The column of "Stroke That Each Element Is Corresponding To" shows the corresponding stroke of each element.

The column of "Example Character" gives some characters containing the stroke in the same row. It has both Song Type (宋体) and Kai Type (楷体) characters.

The column of "No." shows the serial number of each stroke.

In this invention, "element" is defined as the unit information which is input by keyboard or other appropriate apparatus and can be used to determine if desired Chinese characters exist. For example, Latin letter b, p, m and f are the elements in Pinyin input method.

12 simplified strokes boiled down from the above 34 strokes are used as elements in one example of this invention. Symbols of these 12 elements are presented in the third column of Table 1. Each simplified stroke may contain one or more strokes. If a simplified stroke contains only one stroke, this stroke will be used as the symbol of the corresponding element; while if a simplified stroke contains more than one stroke, any one of those strokes may be used as the symbol of the corresponding element. Therefore, the symbol of an element may not be unique, but, the differences in symbol selection do not introduce essential change to this invention.

In this invention, "stroke combination" is defined as a certain number of strokes or simplified strokes that are one-dimension orderly arranged from left to right. For example, "一丨" forms a stroke combination, and "丨一" forms another one.

In this invention, "dimensionality reduction of Chinese character" is defined as a process to arrange all strokes that form a character into a stroke combination using strokes or selected simplified strokes according to this character's stroke order. For example, the stroke combination of "米" after dimensionality reduction is "一丨丶", and the stroke combination of "十" after dimensionality reduction is "一丨".

Any character can be then converted from a 2-D graph into a 1-D ordered arrangement by dimensionality reduction.

Thus, each character has a corresponding stroke combination. Conversely, for any given stroke combination, one may check if a corresponding character exists. According to this theory, input methods of this invention can then determine whether there is one or more corresponding character after checking the input stroke combination. If so, the corresponding characters can be displayed by input method software.

In this invention, the order of strokes for each Chinese character will be in accordance with "Chinese Character Stroke Order Standard of GB13000.1 Character Set" (1999) and "Modern Chinese Universal Character Stroke Order Standard" (1997) of National Language Committee of People's Republic of China.

It is worth to point out that there could be more than one character corresponding to the same stroke combination. For example, 4 characters, "人, 八, 入, 乂", can be converted into the same stroke combination "丿丶".

"Visual representation of stroke combination" is defined as a Chinese character component or a character itself that can be used to mark a stroke combination due to the fact that this component or character can be converted into this stroke combination after dimensionality reduction. For example, the component "亻" can be used as the visual representation of stroke combination "丿丨", and the character "十" can be used as the visual representation of "一丨". Here, the definition of Chinese character component is taken from "Chinese Character Component Standard of GB13000.1 Character Set for Information Processing" (1997) of National Language Committee. Visual representation of stroke combination may also be called visual representation for short.

According to this definition, any character may be regarded as the visual representation of the stroke combination obtained after its dimensionality reduction.

In one implementation example of this invention, 3 strokes, 乚, 乛, and 乙, of the 12 simplified strokes in Table 1 are further combined as 乚. Thus we get 10 elements corresponding to 10 simplified strokes as shown in Table 2. In Table 2, "Element Symbol" column below "10 Simplified Strokes" lists the symbol of each element, while the symbol in bracket is its another commonly used symbol.

In an implementation example, 10 elements corresponding to the above 10 simplified strokes are selected. One may use these 10 simplified strokes to get a stroke combination for each Chinese character through dimensionality reduction. On the other hand, by typing each element corresponding to a stroke combination, the corresponding character can be found. For example, the stroke combination "丨乛一" can be obtained after applying dimensionality reduction on "口", while the character "口" can be found by checking "丨乛一" input by a user.

In a further implementation example of this invention, in order to improve input efficiency, 46 sets of stroke combinations are selected. Each set contains one or more commonly used stroke combinations. In addition to the 10 elements mentioned above, 46 elements that are corresponding to these 46 sets of stroke combinations are selected. If an input element is corresponding to more than one stroke combination, input method software will analyze all its stroke combinations, together with any stroke combinations from previous input, to determine if there are any characters corresponding to those stroke combinations. These 46 elements and their corresponding stroke combination sets are listed in Table 3.

In Table 3, "No." column shows each element's serial number; "Representative Visual Representation" column shows the visual representation of the representative stroke combination of each set, and this visual representation is also used as the symbol of the corresponding element. Since some stroke combination sets contain two or more stroke combinations, we may use the visual representation of any of these stroke combinations to represent that set and the symbol of the corresponding element. For example, visual representation "夊" and "㇉" are both belong to the stroke combination set which the element with symbol "㇉" is corresponding to (see the 33$^{rd}$ line in Table 3), therefore, "夊" can replace "㇉" as the representative visual representation of this stroke combination set, and replace "㇉" as symbol of this element. However, the differences in representative visual representation selection and element symbol selection do not introduce essential changes to this invention.

In Table 3, "Representative Stroke Combination" column gives the stroke combination corresponding to the representative visual representation shown in its left column; "Visual Representation of Stroke Combination" column shows the visual representation of stroke combination listed in its right column; "Stroke Combinations Contained In Each Stroke Combination Set" column shows all stroke combinations contained in a stroke combination set, where names of strokes are shown in bracket and are separated by "/"; "Example Character" column shows some characters that contain stroke combination on its left column after applying dimensionality reduction on them.

In an optimal implementation example of this invention, elements corresponding to the 10 simplified strokes in Table 2 and elements corresponding to the 46 stroke combination sets in Table 3 are selected and assigned to the keys of computer keyboard.

In a more detailed optimal implementation example, 8 elements from Table 2 and 46 elements from Table 3 are divided into 27 groups as shown in Table 4.

In Table 4, elements in the same line will be assigned to the same key (for example, elements corresponding to "王" and "㇖" will be assigned to the same key), and elements in different lines will be assigned to different keys.

This kind of element-to-key assignments will eventually lead to a kind of keyboards that have the symbols of the elements selected in this invention on its keys. Therefore, the protection of this kind of keyboards is within the protection scope of this invention.

A practical way to use those symbols of the elements selected in this invention is to print them on a set of labels. These labels can then be adhered to the corresponding keys on a keyboard. The protection of this kind of label sets is within the protection scope of this invention.

Another way to use those symbols of the elements selected in this invention is to print or label them on a set of keys. These keys can later be used to replace the existing keys on a keyboard. The protection of this kind of key sets is within the protection scope of this invention.

Figure 1:
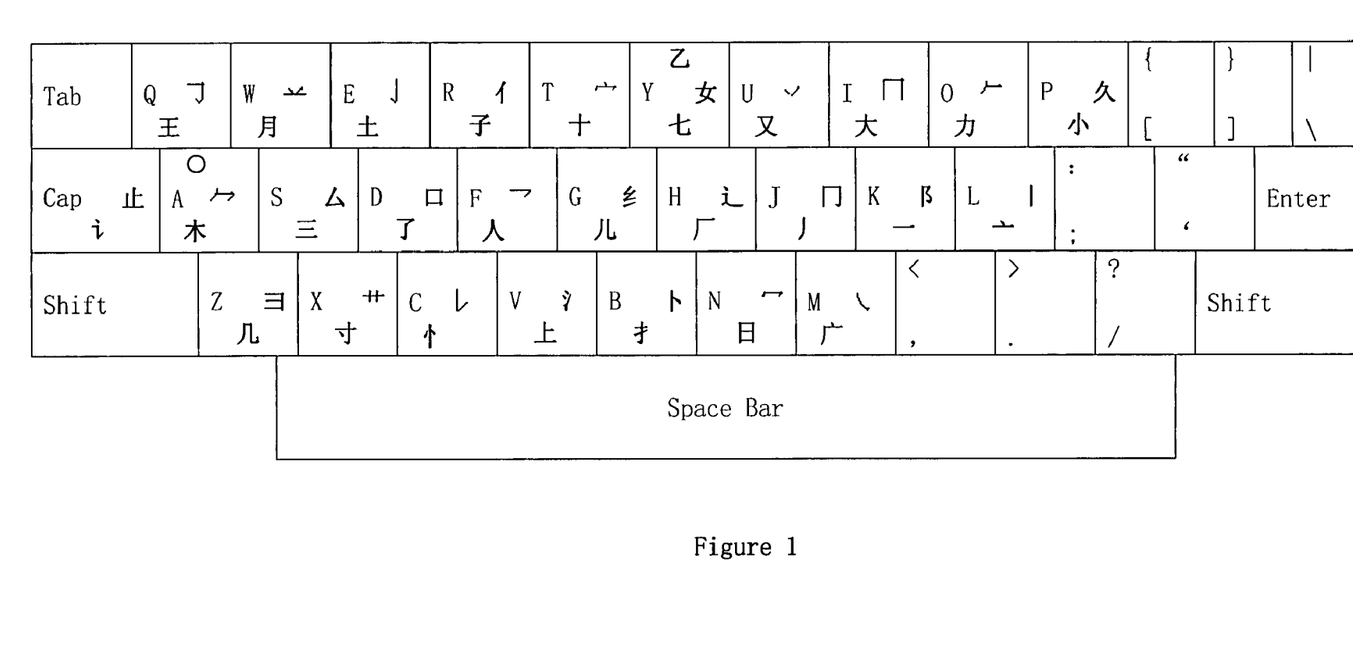
FIG. 1-4 show 4 optimized keyboard layout of this invention. Keyboards with such layout can be used to implement the computer Chinese character input methods described this invention.

As a detailed example of this invention, 10 elements corresponding to the 10 simplified strokes in Table 2 and 46 elements corresponding to the 46 sets of stroke combinations in Table 3 are assigned to 26 English letter keys and the Caps Lock key on QWERTY keyboard. FIG. 1 shows this optimal layout.

As shown in FIG. 1, each key is assigned 2 or 3 elements. For keys with 2 elements, the 2 elements are on the bottom and middle part of a key respectively; for keys with 3 elements, the 3 elements are on the bottom, middle, and upper part of a key respectively. Each element is marked at its assigned position using its corresponding symbol. English letters in FIG. 1 are used for English input only and will not take part in Chinese character input described this invention. Since one may select different symbols for an element, symbols on keyboard in FIG. 1 may be changed. For example, one may replace "㇉" with "㇇", or replace "忄" with "心", etc. However, this kind of changes does not introduce essential changes to this invention.

The basic mode to input each element on a key can be described as follows:
(1) Press this key to input its bottom element;
(2) Press Shift key and this key simultaneously to input its middle element;
(3) Press Shift key first, and then press this key to input its upper element.

In practical application, other input modes can be selected to improve input efficiency. For example, one input mode could be:
Press this key to input its bottom and middle elements;
Press Shift key first, and then press this key to input its upper element.

Another input mode could be:
Press this key to input its bottom, middle and upper elements.

The former mode may be called the speedy input mode, and the latter one may be called the general input mode.

There could certainly be other input modes based on different requirements. For example, mix the above two or three modes, or replace Shift key by Ctrl key, and so on. Which mode is used may be decided by each user through software settings.

When inputting a Chinese character, a user will first reduce dimensionality of this character using the elements selected in this invention according to the radicals, components, strokes and stroke order of this character, then key in the obtained elements one by one. All reduction dimensionality inputs that are in accordance with national "Chinese Character Stroke Order Standard of GB13000.1 Character Set" and "Modern Chinese Universal Character Stroke Order Standard" will be supported by this invention. If there is more than one character corresponding to the same input stroke combination, the input software will list all those characters for a user to make a selection.

Figure 2:
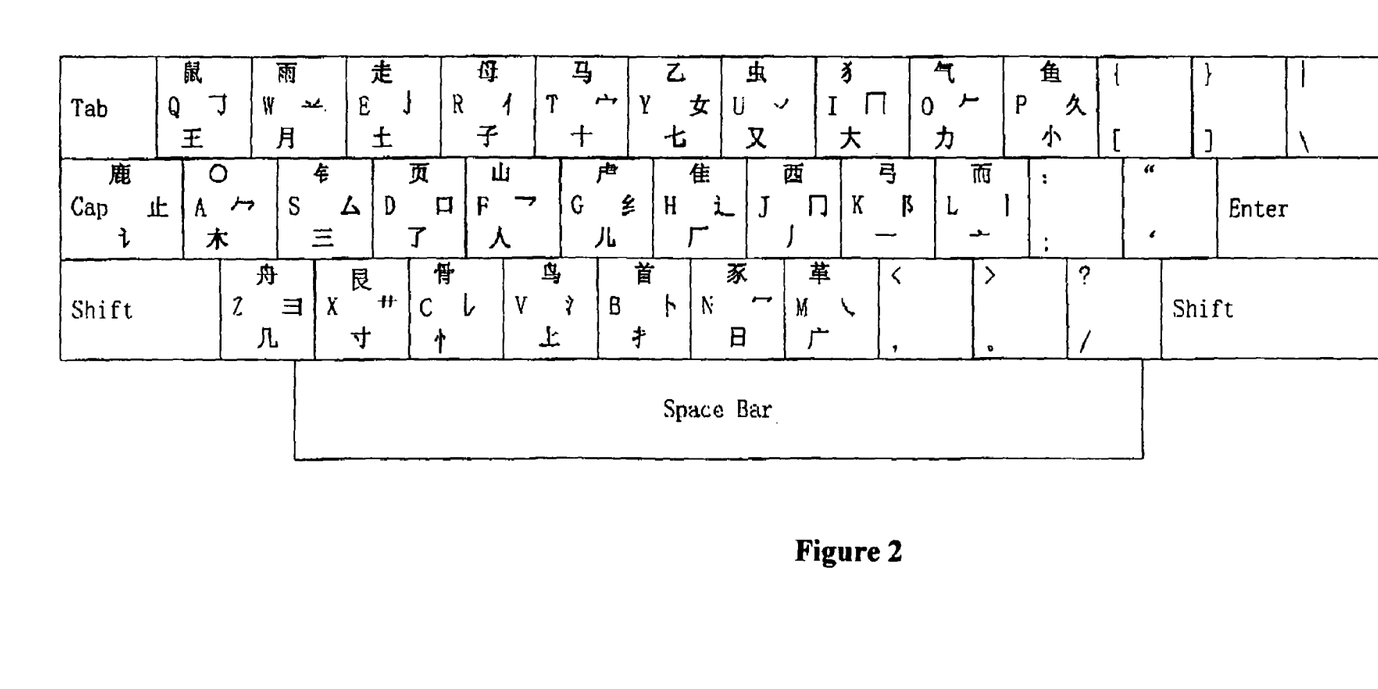

In addition to the 10 elements corresponding to the 10 simplified strokes in Table 2 and 46 elements corresponding to the 46 stroke combination sets in Table 3, more elements may be selected. In one detailed example, 25 more elements are added, which are corresponding to the 25 stroke combination sets as shown in Table 5. Their representative visual representations are: 山, 彡, 马, 鸟, 气, 礻, 鸟, 母, 雨, 瓦, 面, 产, 业, 龙, 走, 豕, 雨, 隹, 鱼, 革, 青, 首, 鹿, 鼠, 鼻. Thus, in this example, total 81 elements are included. FIG. 2 shows its optimal keyboard layout.

Examples to input a Chinese character:
(1) Input "㇉"
According to basic input mode, the following key-ins are permissive:
(Shift+㇆)
(Shift+㇇)(Shift+㇀)
(Shift+㇇)(-)
(2) Input "㇇"
According to speedy input mode, the following key-ins are permissive:
˅木
˅十人
丶丿木
丶丿十人
丶丿-丨丿
(2) Input "㇇"
According to general input mode, the following key-ins are permissive:
一豕
丶丶㇉豕
一一㇖丿丿丶

(4) Input "妈"

According to basic input mode, the common key-in is: (Shift+女)(Shift)马

According to speedy input mode, the common key-in is: 女(Shift)马

According to general input mode, the common key-in is: 女马

In another implementation example, 12 elements corresponding to the 12 simplified strokes in Table 1 are selected and can be used for dimensionality reduction on all Chinese characters.

Figure 3:
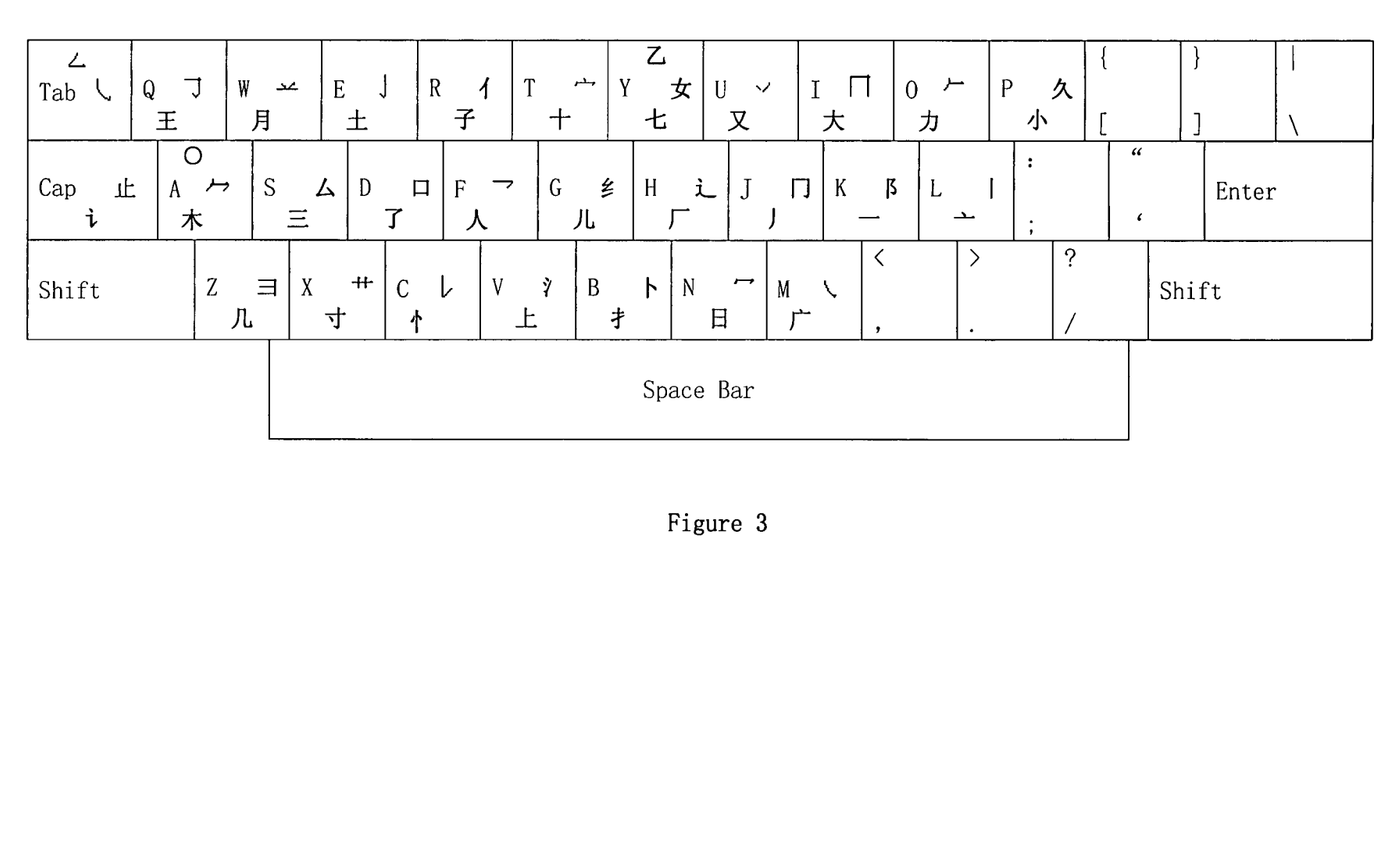

In a further implementation example, in addition to above 12 elements, 46 elements corresponding to the 46 stroke combination sets listed in Table 3 are selected. FIG. 3 shows a keyboard layout of this example.

Figure 4:
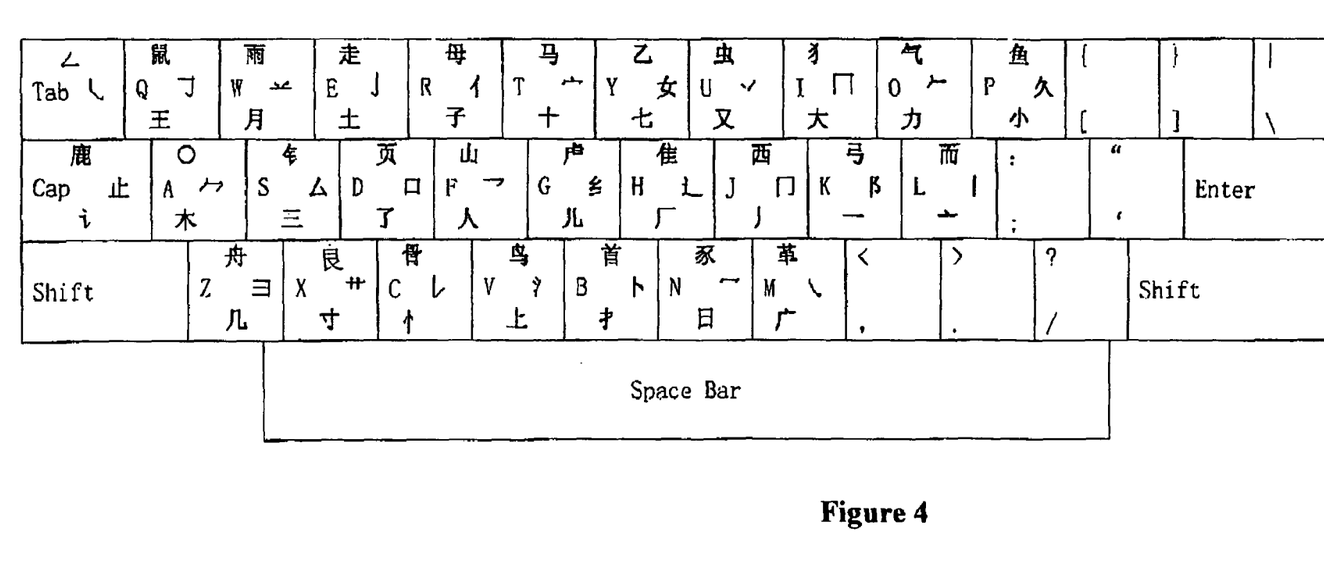

In a further implementation example, in addition to the 12 elements and the 46 elements mentioned above, 25 elements corresponding to the 25 stroke combination sets in Table 5 are further selected. Thus, in this example, total 83 elements are included. FIG. 4 shows an optimal keyboard layout for these 83 elements.

TABLE 1

| | Simplified Stroke | | Chinese Character Stroke | | | |
|---|---|---|---|---|---|---|
| Element No. | Element Name | Element Symbol | Name of Stroke That Each Element Is Corresponding To | Stroke That Each Element Is Corresponding To | Example Charater | No. |
| 1 | 横 | 一 | 横 | 一 | 三, 专, 白 | 1 |
| | | | 提 | ✓ | 坏, 打, 辆, 牺, 冷, 江 | 2 |
| 2 | 竖 | 丨 | 竖 | 丨 | 旧, 业 | 3 |
| 3 | 撇 | 丿 | 撇 | 丿 | 人, 周, 爪, 身, 舌, 勾 | 4 |
| 4 | 捺 | ㇏ | 捺 | ㇏ | 八, 处 | 5 |
| | (点) | (丶) | 点 | 丶 | 江, 心, 宝, 冬 | 6 |
| 5 | 横折 | ㇕ | 横钩 | ㇕ | 买, 宝, 皮, 饭 | 7 |
| | | | 横折竖(横折) | ㄱ | 见, 这, 己, 尸, 日, 面 | 8 |
| | | | 横折撇(横撇) | ㇇ | 夕, 社, 祭, 登, 今, 之 | 9 |
| 6 | 竖钩 | 亅 | 竖钩(竖钩) | 亅 | 刚, 于, 牙 | 10 |
| | | | 弯竖钩(弯钩) | ) | 狗, 家 | 11 |
| | | | 撇钩 | ノ | 乄 | 12 |
| 7 | 竖折 | ㇄ | 竖折横(竖折) | ㇄ | 巨, 凶, 母, 乐, 发, 牙 | 13 |
| | | | 竖弯横(竖弯) | ㇄ | 西, 四 | 14 |
| | | | 竖弯横钩(竖弯钩) | ㇄ | 儿, 乱, 己, 电, 心, 匕 | 15 |
| | | | 竖折提(竖提) | ㇄ | 民, 以, 长, 瓦, 收, 顾, 鼠 | 16 |
| 8 | 撇折 | ㇈ | 撇折横(撇折) | ㇈ | 车, 东, 公, 至, 亥, 红 | 17 |
| | | | 撇折点(撇点) | ㇈ | 女, 巡 | 18 |
| 9 | 捺钩 | ㇏ | 捺钩(斜钩) | ㇏ | 弋, 戈, 我, 成 | 19 |
| | | | 卧钩(卧钩) | ㇌ | 心, 想 | 20 |
| 10 | 横折钩 | ㇆ | 横折竖钩(横折钩) | ㇆ | 门, 母, 仓, 却, 羽, 也, 方, 而 | 21 |
| 11 | 横折折 | 乙 | 横折竖折横(横折折) | ㇅ | 凹 | 22 |
| | | | 横折竖弯横(横折弯) | ㇈ | 没, 船 | 23 |
| | | | 横折竖弯横钩(横折弯钩) | 乙 | 几, 丸, 乙, 艺 | 24 |
| | | | 横折竖折提(横折提) | ㇋ | 认, 颍, 鸩 | 25 |
| | | | 横折捺钩(横斜钩) | ㇌ | 风, 飞 | 26 |
| 12 | 多折 | ㇅ | 横折竖折横折竖(横折折) | ㇅ | 凸 | 27 |
| | (圈) | (O) | 横折竖折横折竖钩(横折折折钩) | 孑 | 乃, 扬 | 28 |
| | | | 横折竖折横折撇(横折折撇) | ㇅ | 及, 建, 这 | 29 |
| | | | 横折撇折弯竖钩(横撇弯钩) | ㇌ | 阳, 都 | 30 |
| | | | 竖折横折竖(竖折折) | ㇅ | 鼎 | 31 |

TABLE 1-continued

| | | | |
|---|---|---|---|
| 竖折横折竖钩(竖折折钩) | ㄅ | 与, 马, 号, 丂 | 32 |
| 竖折横折撇(竖折撇) | ㄥ | 专 | 33 |
| 圈 | O | O | 34 |

Note:
Translation of stroke related names is as the follows and will be used for all tables and other places in this invention.

| Chinese Name | Pinyin | Abbreviation Name | English Name |
|---|---|---|---|
| 横 | Héng | H | Horizontal |
| 提 | Tí | T | Rise |
| 竖 | Shù | S | Vertical |
| 撇 | Piě | P | Falling Rightwards |
| 捺 | Nà | N | Falling Leftwards |
| 点 | Diǎn | D | Dot |
| 折 | Zhé | Z | Turning |
| 钩 | Gōu | G | Hook |
| 弯 | Wān | W | Bend |
| 斜 | Xié | X | Slant |
| 卧 | Wò | C | Crouch |
| 圈 | Quān | Q | Circle |
| 多折 | Duō Zhé | M | Mulitple Turning |

TABLE 2

| | 10 Simplified Strokes | | 12 Simplified Strokes | | |
|---|---|---|---|---|---|
| No. | Element Name | Element Symbol | Element Name | Element Symbol | No. |
| 1 | 横 | 一 | 横 | 一 | 1 |
| 2 | 竖 | 丨 | 竖 | 丨 | 2 |
| 3 | 撇 | 丿 | 撇 | 丿 | 3 |
| 4 | 捺(点) | 丶(丶) | 捺(点) | 丶(丶) | 4 |
| 5 | 横折 | ㄱ | 横折 | ㄱ | 5 |
| 6 | 竖钩 | 亅 | 竖钩 | 亅 | 6 |
| 7 | 竖折 | ㄴ | 竖折 | ㄴ | 7 |
|  |  |  | 撇折 | ㄥ | 8 |
|  |  |  | 捺钩 | ㇈ | 9 |
| 8 | 横折钩 | ㄱ | 横折钩 | ㄱ | 10 |
| 9 | 横折 | 乙 | 横折 | 乙 | 11 |
| 10 | 多折(圈) | ㄅ(O) | 多折(圈) | ㄅ(O) | 12 |

TABLE 3

| No. | Representative Visual Representation | Representative Stroke Combination | Visual Representation of Stroke Combination | Stroke Combinations In Each Stroke Combination Set | Example Character |
|---|---|---|---|---|---|
| 1 | 十 | 一丨 | 十 | 一丨 (横/竖) | 斥, 千, 下, 舌 |
| 2 | 厂 | 一丿 | 厂 | 一丿 (横/撇) | 有, 石, 不, 尸 |
| 3 | 七 | 一ㄴ | 七 | 一ㄴ (横/竖折) | 互, 汇, 已, 巴, 毛, 牙, 民, 比, 瓦, 车, 屯, 巨, 既, 世, 延, 弋, 钱, 氏 |
| 4 | 卜 | 丨丶 | 卜 | 丨一 (竖/横) | 占, 支, 片, 轮, 虞, 卤, 牲, 临 |
|  |  |  | 卜 | 丨丶 (竖/点) | 不, 斥, 卡, 爪, 神, 甫, 书, 州 |
| 5 | 冂 | 丨ㄱ | 冂 | 丨ㄱ (竖/横折) | 贝, 见, 央, 回, 田, 血, 目, 自, 具, 四, 曾, 卤 |
| 6 | 冂 | 丨ㄱ | 冂 | 丨ㄱ (竖/横折钩) | 冈, 巾, 门, 丽, 再, 枣 |

TABLE 3-continued

| No. | Representative Visual Representation | Representative Stroke Combination | Visual Representation of Stroke Combination | Stroke Combinations In Each Stroke Combination Set | Example Character |
|---|---|---|---|---|---|
|  |  |  | 卩 | 𠃌丨(横折钩/竖) | 爷, 韦, 也, 报, 却 |
|  |  |  | 㔾 | 𠃌乚(横折钩/竖折) | 仓, 厄, 顾 |
| 7 | 𠂉 | 丿一 | 𠂉 | 丿一(撇/横) | 矢, 牛, 斤, 放 |
| 8 | 亻 | 丿丨 | 亻 | 丿丨(撇/竖) | 什, 川, 齐, 皮, 段, 延 |
| 9 | 人 | 丿㇏ | 人 | 丿㇏(撇/捺)或丿丶(撇/点) | 八, 入, 父, 风, 文, 六, 火, 贝, 乏, 爱, 穴, 献, 辰, 良, 衣, 农, 龙, 戈, 成, 线, 春, 亥, 兆, 齿 |
| 10 | 𠂎 | 丿𠃍 | 𠂎 | 丿𠃍(撇/横折) | 欠, 饱, 角, 色, 龟 |
|  |  |  | 刂 | 丨亅(竖/竖钩) | 到, 刚 |
| 11 | 儿 | 丿乚 | 儿 | 丿乚(撇/竖折) | 匕, 乐, 迎, 宽 |
| 12 | 几 | 丿乙 | 几 | 丿乙(撇/横折) | 九, 凤, 殳 |
| 13 | 亠 | 丶一 | 亠 | 丶一(点/横) | 京, 立, 文, 方, 冷, 壮, 病, 兆, 国 |
| 14 | 丷 | 丶丿 | 丷 | 丶丿(点/撇) | 米, 火, 为, 兰, 总, 学, 爱 |
| 15 | 冖 | 丶𠃍 | 冖 | 丶𠃍(点/横折) | 军, 党, 受, 学, 户, 今, 神, 被 |
| 16 | 讠 | 丶乙 | 讠 | 丶乙(点/横折) | 认, 记, 狱 |
|  |  |  | 言 | 丶一一一丨𠃍一(点/横/横/竖/横折/横) | 信, 誉 |
|  |  |  | 凢 | 乙丶(横折/点) | 瓦 |
| 17 | 又 | 𠃍㇏ | 又 | 𠃍㇏(横折/捺) | 支, 友, 察, 予, 矛, 登, 经, 皮, 乏, 蛋 |
| 18 | 了 | 𠃍亅 | 丁 | 𠃍丨(横折/竖) | 辽, 予, 矛, 承, 亟 |
|  |  |  | 了 | 𠃍亅(横折/竖钩) |  |
| 19 | 厶 | 乚丶 | 厶 | 乚丶(竖折/点) | 台, 去, 离, 鬼, 至, 叁, 以, 长, 瓜, 既, 尤 |
| 20 | 力 | 𠃌丿 | 力 | 𠃌丿(横折钩/撇) | 刀, 刃, 办, 方, 做 |
| 21 | 阝 | ㇇丨 | 阝 | ㇇丨(多折/竖) | 阿, 那 |
| 22 | 三 | 一一一 | 三 | 一一一(横/横/横) | 目, 丰, 邦, 非, 兰, 羊, 着, 春, 面, 耳, 未, 害, 其, 段, 拜, 鬃 |
|  |  |  | 彡 | 丿丿丿(撇/撇/撇) | 须, 彩, 鬃 |
|  |  |  | 灬 | 丶丶丶丶(点/点/点/点) | 点, 黑, 色 |
|  |  |  | 巛 | 乚乚乚(竖折/竖折/竖折) | 巡, 巢 |

TABLE 3-continued

| No. | Representative Visual Representation | Representative Stroke Combination | Visual Representation of Stroke Combination | Stroke Combinations In Each Stroke Combination Set | Example Character |
|---|---|---|---|---|---|
| 23 | 土 | 一丨一 | 土 | 一丨一 (横/竖/横) | 工, 士, 坏, 田, 赤, 老, 去, 载, 牲, 壬, 垂 |
| 24 | 卄 | 一丨丨 | 卄 | 一丨丨 (横/竖/竖) | 草, 其, 黄, 共, 曹, 世, 亚, 廿, 耳, 变, 扁, 垂, 带, 塞, 典, 皿, 血, 要, 曲 |
|  |  |  | 山 | 丨丨一 (竖/竖/横) |  |
| 25 | 大 | 一丿乀 | 大 | 一丿乀 (横/撇/捺) | 丈, 央, 矢, 天, 夭, 尺, 太, 兴, 益, 真, 足, 正, 是, 捷, 共, 关, 区, 笑, 监 |
|  |  |  | 六 | 丿一乀 (撇/横/点) |  |
| 26 | 扌 | 一亅一 | 扌 | 一亅一 (横/竖钩/横) | 扩, 我 |
|  |  |  | 三 | 丿一一 (撇/横/横/撇) | 看, 拜, 弄 |
|  |  |  | 手 | 丿一一亅 (撇/横/横/竖钩) | 拿 |
| 27 | 寸 | 一亅丶 | 寸 | 一亅丶 (横/竖钩/点) | 对, 寿 |
| 28 | 上 | 丨一一 | 上 | 丨一一 (竖/横/横) | 卡, 叔, 北, 乍, 丑, 再, 里, 黑, 假, 甘 |
| 29 | 口 | 丨フ一 | 口 | 丨フ一 (竖/横折/横) | 足, 中, 豆, 石, 舌, 史, 束, 兔, 勘, 五, 曲, 衷, 官, 假 |
| 30 | 久 | 丿フ乀 | 久 | 丿フ乀 (撇/横折/捺) | 夕, 冬, 处, 岁, 反, 发, 歹, 麦, 俊, 然, 察 |
| 31 | 广 | 丶一丿 | 广 | 丶一丿 (点/横/撇) | 床, 病, 亦 |
| 32 | 丷 | 丶丿一 | 丷 | 丶丿一 (点/撇/横) | 前, 关, 半, 并, 判, 立, 豆, 喜, 南, 亚, 业, 乎, 培, 黑, 善, 检 |
| 33 | 氵 | 丶丶一 | 氵 | 丶丶一 (点/点/横) | 汉, 斗, 头, 图 |
|  |  |  | 水 | 亅フ丿乀 (竖钩/横折/撇/捺) | 冰, 丞 |
|  |  |  | 氺 | 亅丶一丿乀 (竖钩/点/横/撇/捺) | 寨, 录, 隶, 函, 求 |
|  |  |  | 永 | フ亅丿乀 (横折钩/横折/撇/捺) | 永 |
| 34 | 忄 | 丶丶丨 | 忄 | 丶丶丨 (点/点/竖) | 快 |
|  |  |  | 心 | 丶レ丶丶 (点/竖钩/点/点) | 想 |
|  |  |  | 小 | 亅丶丶丶 (竖钩/点/点/点) | 恭, 添 |

TABLE 3-continued

| No. | Representative Visual Representation | Representative Stroke Combination | Visual Representation of Stroke Combination | Stroke Combinations In Each Stroke Combination Set | Example Character |
|---|---|---|---|---|---|
| 35 | 宀 | 、、㇆ | 宀 | 、、㇆(点/点/横折) | 穴, 家 |
| 36 | 辶 | 、㇋㇏ | 辶 | 、㇋㇏(点/多折/捺) | 辽 |
| | | | 辶 | ㇋㇏(多折/捺) | 建, 及, 专 |
| 37 | 彐 | ㇆——  | 彐 | ㇆——(横折/横/横) | 妇, 录, 求, 既, 白 |
| 38 | 子 | ㇆亅— | 子 | ㇆亅—(横折/竖钩/横) | 好, 孔, 子 |
| 39 | 小 | 亅丿、 | 小 | 亅丿、(竖钩/撇/点) | 尖, 尘, 尔, 乐, 亲, 示, 亦, 赤 |
| | | | 小 | 丨丿、(竖/撇/点) | 少, 束, 策, 未, 乘, 兼, 补 |
| | | | 业 | 丨、丿(竖/点/撇) | 光, 党, 曾 |
| 40 | 女 | ㇄丿— | 女 | ㇄丿—(竖折撇/撇/横) | 安, 好 |
| 41 | 纟 | ㇄㇄— | 幺 | ㇄㇄(竖折/竖折) | 乡, 丝 |
| | | | 乡 | ㇄㇄—(竖折/竖折/横) | 红, 辫 |
| | | | 幺 | ㇄㇄、(竖折/竖折/点) | 玄, 率 |
| | | | 纟 | ㇄㇄、亅丿、(竖折/竖折/点/竖钩/撇/点) | 系, 累 |
| 42 | 王 | ——丨— | 王 | ——丨—(横/横/竖/横) | 环, 玉, 主, 生, 美, 表, 敖, 青, 麦 |
| 43 | 木 | —丨丿、 | 木 | —丨丿、(横/竖/撇/捺) | 机, 未, 禾, 米, 采, 麻, 果, 朱 |
| 44 | 止 | 丨—丨— | 止 | 丨—丨—(竖/横/竖/横) | 此, 齿, 步, 路, 正, 在, 丘 |
| 45 | 日 | 丨㇆—— | 日 | 丨㇆——(竖/横折/横/横) | 音, 白, 百, 电, 甲, 里, 杲, 单, 更, 禺, 曹, 鬼, 惠 |
| 46 | 月 | 丿㇆—— | 月 | 丿㇆——(竖/横折钩/横/横) | 冇, 肖, 甫, 甬, 身 |
| | | | 月 | 丿㇆——(撇/横折钩/横/横) | 朋, 用, 角 |
| | | | 甩 | ㇆——丿(横折钩/横/横/撇) | 甩, 那 |

TABLE 4

木
扌
艹
了
土
人
儿
厂
大
丿
一
广
日
力
小
王
子
三
十
又
上
月
寸

TABLE 4-continued

七
几
讠
卜
乚
丨
纟
冂
阝
丶
九
亻
卜
口
丁
辶
冂
刂

TABLE 4-continued

5
宀
户
夂
刁
亻
厶
宀
10
丷
氵
亠
廾
女
彐
15
止

TABLE 5

| No. | Representative Visul Representation | Representative Stroke Combination | Visul Representation of Stroke Combination | Stroke Combinations In A Stroke Combination Set | Example Character |
|---|---|---|---|---|---|
| 1 | 山 | 丨乚丨 | 山 | 丨乚丨(竖/竖折/竖) | 出, 岁, 岛 |
| 2 | 犭 | 丿乛丿 | 犭 | 丿乚丿(撇/竖钩/撇) | 狗, |
|  |  |  | 豸 | 丿丶丶丿丿丿(撇/点/点/撇/竖钩/撇/撇) | 豹, 貌 |
| 3 | 弓 | 乛一乚 | 弓 | 乛一乚(横/横/多折) | 张, 弗, 弟, 弱, 疆, 爽 |
| 4 | 马 | 乛乚一 | 马 | 乛乚一(横折/多折/横) | 妈, 骈 |
| 5 | 气 | 丿一一乙 | 气 | 丿一一乙(撇/横/横/横折) | 汽 |
| 6 | 钅 | 丿一一一乚 | 钅 | 丿一一一乚(撇/横/横/横/竖折) | 钢 |
|  |  |  | 金 | 丿八一一丨丶一(撇/捺/横/横/竖/点/横) | 鉴, 釜 |
| 7 | 鸟 | 丿勹丶乚一 | 鸟 | 丿勹丶乚一(撇/横折钩/点/多折/横) | 鸡 |
|  |  |  | 乌 | 丿勹丶乚 (撇/横折钩/点/多折) | 岛, 枭 |
| 8 | 母 | 乚乛丨一丶 | 毋 | 乚乛丨一(竖折/横折/竖/横) | 贯 |
|  |  |  | 毌 | 乚乛丨一(竖折/横折钩/撇/横) | 毋 |
|  |  |  | 母 | 乚乛丨一丶(竖折/横折钩/点/横/点) | 每 |
| 9 | 西 | 一丨乛丿乚一 | 西 | 一丨乛丨一(横/竖/横折/竖/竖/横) | 要, 票 |
|  |  |  | 西 | 一丨乛丿乚一(横/竖/横折/撇/竖折/横) | 洒, 酉, 首 |
| 10 | 页 | 一丿丨乛丿丶 | 页 | 一丿丨乛丿丶(横/撇/竖/横折/撇/点) | 愿, 则 |
| 11 | 而 | 一丿丨乛丨丨 | 而 | 一丿丨乛丨丨(横/撇/竖/横折/竖/竖) | 面 |
|  |  |  | 而 | 一丿丨乛丨丨(横/撇/竖/横折钩/竖/竖) | 耐 |

TABLE 5-continued

| No. | Representative Visul Representation | Representative Stroke Combination | Visul Representation of Stroke Combination | Stroke Combinations In A Stroke Combination Set | Example Character |
|---|---|---|---|---|---|
| 12 | 虍 | 丨一𠃍丿乚 | 虍 | 丨一𠃍丿乚 (竖/横/横折/撇/横折) | 虎 |
| 13 | 虫 | 丨𠃍一丨丶 | 虫 | 丨𠃍一丨丶 (竖/横折/横/竖/横/点) | 蛇,虽 |
| 14 | 舟 | 丿丿𠃍丶一丶 | 舟 | 丿丿𠃍丶一丶 (撇/撇/横折钩/点/横/点) | 船 |
| 15 | 走 | 一丨一丨一丿丶 | 走 | 一丨一丨一丿丶 (横/竖/横/竖/横/撇/捺) | 起 |
| 16 | 豕 | 一丿丿丿丿丶 | 豕 | 一丿丿丿丿丶 (横/撇/竖钩/撇/撇/捺) | 家,豪,象,遂 |
| 17 | 雨 | 一丨𠃍丶丶丶丶 | 雨 | 一丨𠃍丶丶丶丶 (横/竖/横折钩/点/点/点/点) | 雨 |
|  |  |  | 雨 | 一丶𠃍丶丶丶丶 (横/点/横折/点/点/点/点) | 雪 |
| 18 | 隹 | 丿丨丶一一一丨一 | 隹 | 丿丨丶一一一丨一 (撇/竖/点/横/横/横/竖/横) | 谁,售,雀 |
| 19 | 鱼 | 丿𠃍丨一一丨一 | 鱼 | 丿𠃍丨一一丨一 (撇/横折/竖/横/横/竖/横) | 鲜,鲁,衔 |
| 20 | 革 | 一丨丨一丨𠃍一一丨 | 革 | 一丨丨一丨𠃍一一丨 (横/竖/竖/横/竖/横折/横/横/竖) | 鞋 |
| 21 | 骨 | 丨𠃍𠃍丶𠃍丨𠃍一一 | 骨 | 丨𠃍𠃍丶𠃍丨𠃍一一 (竖/横折/横折/点/横折/竖/横折钩/横/横) | 滑 |
| 22 | 首 | 丶丿一丿一一一一 | 首 | 丶丿一丿一一一一 (点/撇/横/撇/竖/横折/横/横) | 道 |
| 23 | 鹿 | 丶一丿𠃍丨丨一一乚丿乚 | 鹿 | 丶一丿𠃍丨丨一一乚丿乚 (点/横/撇/横折/竖/竖/横/横/竖/横/竖折) | 麒 |
| 24 | 鼠 | 丿丨一𠃍一一乚丶丶乚丶丶乚 | 鼠 | 丿丨一𠃍一一乚丶丶乚丶丶乚 (撇/竖/横折/横/横/竖/点/点/竖折/点/竖折) | 鼯 |
|  |  |  | 鼠 | 乚乚乚丨𠃍丿丶一乚丶丶乚 (竖折/竖折/竖折/撇/横/竖折/撇/横/竖折/点/点/竖折/点/点/竖折) | 遢,鼍 |
| 25 | 艮 | 𠃍一一乚丿丶 | 艮 | 𠃍一一乚丿丶 (横折/横/横/竖折/撇/捺) | 很,良 |
|  |  |  | 𰕟 | 𠃍一一乚丶 (横折/横/横/竖折/点) | 既,即 |

The invention claimed is:

1. A computer Chinese character input method comprising:

Selecting 10 elements corresponding to the 10 simplified Chinese character simplified strokes which are 一, 丨, 丿, 丶, ㇀, 亅, 乚, 乛, 乙 and 𠃋;

Selecting 46 elements corresponding to the 46 stroke combination sets whose representative visual representations are: 十, 厂, 七, 卜, 冂, 门, 丷, 亻, 人, 𠂉, 儿, 几, 亠, 丶, 冖, 冫, 又, 丁, 二, 丷, 冖, 冫, 又, 丁, 大, 扌, 寸, 上, 口, 夂, 广, 宀, 氵, 忄, 艹, 辶, 木, 止, 日, 月;; 彐, 子, 小, 女, 纟, 王, Assigning said 46 elements, and 8 elements, excluding 乙 and 𠃋 from said 10 elements, to the keyboard in the following way:

TABLE 4

| 木 |
| 扌 |
| 忄 |
| 了 |
| 土 |
| 人 |
| 儿 |
| 厂 |
| 大 |
| 丿 |
| 一 |
| 亠 |
| 广 |
| 日 |
| 力 |
| 小 |
| 王 |
| 子 |
| 三 |
| 十 |
| 又 |
| 上 |
| 月 |
| 寸 |
| 七 |
| 几 |
| 辶 |
| 宀 |
| 卜 |
| 乚 |
| 口 |
| 亅 |
| 乛 |
| 纟 |
| 辶 |
| 冂 |
| 门 |
| 阝 |
| 丨 |
| 丶 |
| 𠂉 |
| 宀 |
| 夂 |
| 刀 |
| 亻 |
| 厶 |
| 亠 |
| ⌵ |
| 冫 |
| ⺍ |
| 艹 |
| 女 |
| 彐 |
| 止 | in the table above, elements in the same line are assigned to the same keys, while those in different lines are assigned to different keys; and Determining desired input characters based on the keystrokes typed by a user on this keyboard.

2. The invention of claim 1, further comprising the step of assigning said 46 elements and the 8 elements to the standard English QWERTY keyboard in the following way:

| A | 木 | 𠂉 |
| B | 扌 | 卜 |
| C | 忄 | 乚 |
| D | 了 | 口 |
| E | 土 | 亅 |
| F | 人 | |
| G | 儿 | 乛 |
| H | 厂 | 纟 |
| I | 大 | 辶 |
| J | 丿 | 冂 |
| K | 一 | 门 |
| L | 亠 | 阝 |
| M | 广 | 丨 |
| N | 日 | 丶 |
| O | 力 | 𠂉 |
| P | 小 | 夂 |
| Q | 王 | 刀 |
| R | 子 | 亻 |
| S | 三 | 厶 |
| T | 十 | 亠 |
| U | 又 | ⌵ |
| V | 上 | 冫 |
| W | 月 | ⺍ |
| X | 寸 | 艹 |
| Y | 七 | 女 |
| Z | 几 | 彐 |
| Caps Lock | 辶 | 止 | in the table above, the first 26 items in the first column from the left "stand for" are the English letter of the QWERTY keyboard, and "Caps Lock" is the capital lock key on the QWERTY keyboard. Elements in the same lines are assigned to the key that the English letter or the "Caps Lock" in that line is on.

3. The invention of claim 1, further comprising the step of selecting 25 elements that are respectively corresponding to the 25 stroke combination sets whose representative visual representations are: 山, 彡, 弓, 马, 气, 丰, 韦, 甘, 皿, 页, 虍, 虫, 舟, 走, 豕, 酉, 隹, 鱼, 革, 骨, 首, 鹿, 鼠, 鼻,;

Assigning these 25 elements to keys of the keyboard.

4. A computer Chinese character input keyboard comprising:

keys marked with "symbols of the" identifiers of 10 simplified stroke elements: 一, 丨, 丿, 丶, ㇀, 亅, 乚, 乛, 乙 and 𠃋;

keys marked with identifiers of the 46 stroke combination set elements: 十, 厂, 七, 卜, 冂, 门, 丷, 亻, 人, 𠂉, 儿, 几, 二, 丷, 冖, 冫, 又, 丁, 大, 扌, 寸, 上, 口, 夂, 彐, 子, 小, 女, 纟, 王, 木, 止, 日, 月;;

identifiers of 8 simplified stroke elements, excluding 乙 and 𠃋 from said 10 simplified stroke elements, and said 46 stroke combination set elements are assigned to keys on the mentioned keyboard in the following way:

TABLE 4

| 木 |
| 扌 |
| 忄 |
| 了 |
| 土 |
| 人 |
| 儿 |
| 厂 |

TABLE 4-continued

大
丿
一
亠
广
日
力
小
王
子
三
十
又
上
月
寸
七
几
辶
尸
卜
Ｌ
口
亅
⺈
纟
辶
冂
门

TABLE 4-continued

阝
丨
丶
冖
疒
夂
コ
亻
厶
宀
丷
氵
𠂇
廾
女
ヨ
止 in the table above, elements in the same line are assigned to the same keys, while those in different lines are assigned to different keys.

5. The input keyboard of claim 4, where said elements appear on labels that are attached to the keys of the keyboard.

6. The input keyboard of claim 4, where said elements appear on caps that are attached to the keys of the keyboard.

* * * * *